United States Patent [19]

Joyce et al.

[11] Patent Number: 5,222,653
[45] Date of Patent: Jun. 29, 1993

[54] MANUFACTURE OF AIRCRAFT TRACK-CANS AND THE LIKE

[75] Inventors: Michael A. Joyce, Balderstone; William Thompson, Bury, both of Great Britain

[73] Assignee: British Aerospace Public Limited Company, London, England

[21] Appl. No.: 842,593

[22] Filed: Feb. 28, 1992

[30] Foreign Application Priority Data

Mar. 1, 1991 [GB] United Kingdom ............... 9104370

[51] Int. Cl.$^5$ ............................................. B23K 31/02
[52] U.S. Cl. ................................. 228/173.6; 228/184
[58] Field of Search ................... 228/173.6, 182, 184; 72/56–57, 60, 347, 348

[56] References Cited

U.S. PATENT DOCUMENTS

| | | | |
|---|---|---|---|
| 2,560,822 | 7/1951 | Robinson | 72/368 X |
| 2,659,966 | 11/1953 | Turnbull | 228/154 |
| 2,966,873 | 1/1961 | Hoffman et al. | 72/57 |
| 3,635,590 | 1/1972 | Phillips . | |
| 3,697,193 | 10/1972 | Phillips . | |
| 4,129,025 | 12/1978 | Carey et al. | 72/348 |
| 4,205,546 | 6/1980 | Lagasse et al. | 72/347 |
| 4,399,970 | 8/1983 | Evans | 244/214 |
| 4,440,337 | 4/1984 | Eckert | 228/182 X |
| 4,801,070 | 1/1989 | Horn et al. | 228/184 |
| 4,838,503 | 6/1989 | Williams . | |
| 5,016,458 | 5/1991 | De Smet | 72/57 |

FOREIGN PATENT DOCUMENTS

| | | |
|---|---|---|
| 0291328 | 11/1988 | European Pat. Off. . |
| 978939 | 11/1950 | France . |
| 423174 | 1/1935 | United Kingdom . |
| 623243 | 5/1949 | United Kingdom . |
| 690318 | 4/1953 | United Kingdom . |
| 1158194 | 7/1969 | United Kingdom . |
| 1197441 | 7/1970 | United Kingdom . |

Primary Examiner—Kenneth J. Ramsey
Attorney, Agent, or Firm—Cushman, Darby & Cushman

[57] ABSTRACT

In conventional track-can manufacture they are formed from symmetrical halves made (for example, by drop hammering) split along the longitudinal axis of the finished component. The conventional welding process required to complete the track-cans is then complicated due to the arcuate configuration of these components.

According to the present invention track-cans are manufactured from a plurality of substantially tubular sections, for example a cap-end (39), a body portion (43) and a flange end (40). The components are made by deep drawing from a blank cut of suitable material. The components are welded together at their interface regions to form the track-can. The tubular construction of the components enables the process of peripheral welding which in turn is comparatively simple, and particularly amenable to robotic welding. The prior art welding process was considerably more complicated due to the arcuate configuration of track-cans.

10 Claims, 5 Drawing Sheets

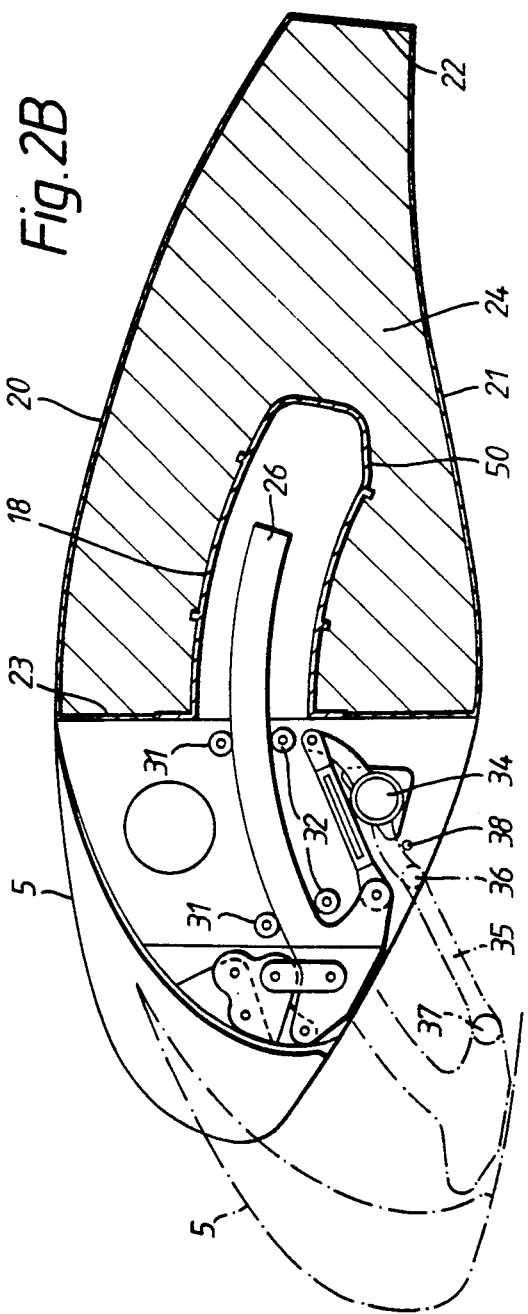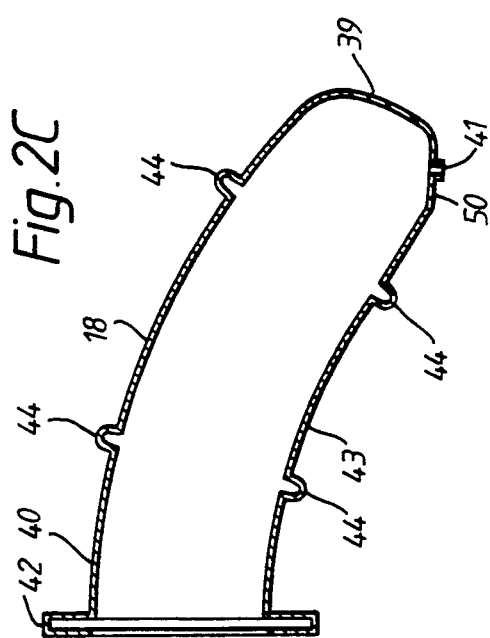

MANUFACTURE OF AIRCRAFT TRACK-CANS AND THE LIKE

BACKGROUND OF THE INVENTION

1. Field of the Invention

The present invention relates to the manufacture of aircraft track-cans or the like.

2. Description of the Related Art

Aerodynamic flying control surfaces such as slats and flaps are often powered by a system of rotary actuators and rack and pinions located in the leading edge of aircraft wings. The racks are arcuate to provide the required flap or slat movement and must extend into the main wing structure when retracted. It is quite common, particularly on large modern airliners, for fuel to be contained within the main wing structure. Accordingly, the wing is constructed in the form of a sealed container and means are provided to isolate the racks of the rack and pinions used to drive the flaps and slats from the fuel. It is known to provide apertures in the leading wall of the wing structure through which the racks may pass into the interior of flanged cans, known as track-cans, sealingly surrounding the apertures inside the wing structure.

In order to keep the dimensions of the track-cans small to save weight and avoid wasting fuel space, the track-cans are preferably made generally cylindrical but with arcuate longitudinal axes conforming to the arcuate movement of the racks they are to contain. The manufacture of track-cans thus shaped has hitherto comprised forming the cans (for example, by drop hammering) in two identical halves, split along the longitudinal axis, i.e. along the arc of the rack when retracted. After forming the halves, a flange is present around the periphery of each of the halves which must be removed before welding them together. This operation can lead to inaccuracies in the component, and after removal of the flange, the halves are prone to distortion when handled. The two halves are initially tack welded together (in an attempt to prevent relative movement therebetween) and subsequently seam welded to form the required track-can. The seam welding process is difficult to perform manually and, furthermore, is not readily automated because of the long and arcuate nature of the seam. Further, formation of the two halves of the track-can requires a tool of unconventional shape but relatively high tolerance.

SUMMARY OF THE INVENTION

It is an object of the present invention to provide a method of manufacturing track-cans or the like which makes use of relatively simple tooling and which simplifies welding operations.

According to one aspect of the present invention there is provided a method of manufacturing a track-can or the like including the steps of:

separately manufacturing at least a cap-end and a flange-end for the track-can, at least one of which is made by deep drawing from a blank cut from suitable metal, and each having an interface region; and welding the flange-end and the cap-end at their interface regions to form the track-can.

Preferably the cap-end of the track-can is manufactured by cutting a blank of predetermined shape from a sheet of suitable metal, placing the blank in a deep draw machine, pre-forming it into a top-hat shape by means of a punch, drawing the top-hat into an elongated shape with a predetermined end profile and expanding the drawn cap-end in a female split cavity die to desired dimensions.

Preferably the flange-end is manufactured by cutting a blank of predetermined shape from a suitable metal, placing the blank in a deep draw machine, advancing a tool against the blank and against resistance of a resilient bag under pressure to form a top-hat shape, cutting a flange profile from the top-hat rim, machining off the blank end of the top-hat, and expanding the open-end of the top hat and expending the open-ended top hat into a female tool for final dimensional accuracy.

Optionally, the track-can further includes a central body portion which is manufactured by deep drawing from a blank cut of suitable metal, and having two interface regions for connection to the interface regions of said cap-end and said flange end respectively.

Preferably, the central body portion of the track-can is made by cutting a blank from a suitable metal, placing the blank in a deep-draw machine, advancing a tool against the blank and against resistance of a resilient bag under pressure to form a top-hat shape, machining off the end of the top-hat and the rim of the top-hat and expanding the open ended cylinder into a female tool for final dimensional accuracy.

Preferably the components of the track-can are placed on pallets in pairs and offered to an extending mandrel which is then raised to the vicinity of a welding tool carried by a robotic arm. The arm is positioned adjacent the ends of the pairs of parts to be mated and the mandrel is rotated beneath the welding arm to form a circular weld. This process is repeated to mate the previously mated two components to the remaining component.

According to another aspect of the present invention there is provided a method of manufacturing a track-can or the like, including the steps of:

separately manufacturing a plurality of substantially tubular parts, at least one of which is made by deep drawing from a blank cut from suitable material, and each of said plurality of tubular parts having at least one interface region which has a shape which corresponds to the shape of an interface region of another of said plurality of tubular parts to which it is to be connected; and connecting the plurality of tubular parts at their interface regions to form the track-can.

The word "tubular" should not be taken to imply that the parts must be cylindrical in shape.

BRIEF DESCRIPTION OF THE DRAWINGS

A method according to the invention will now be described by way of example only, and with reference to the accompanying drawings of which:

FIG. 2B is a cross-section through a typical wing slat drive system at a further wing location;

FIG. 2C is a cross-section through a track-can for use with the wing and drive systems shown in FIGS. 1, 2A and 2B;

In the drawings, common elements have been given identical reference numbers for convenience of reference.

DETAILED DESCRIPTION OF THE PRESENTLY PREFERRED EXEMPLARY EMBODIMENTS

Figure 1:
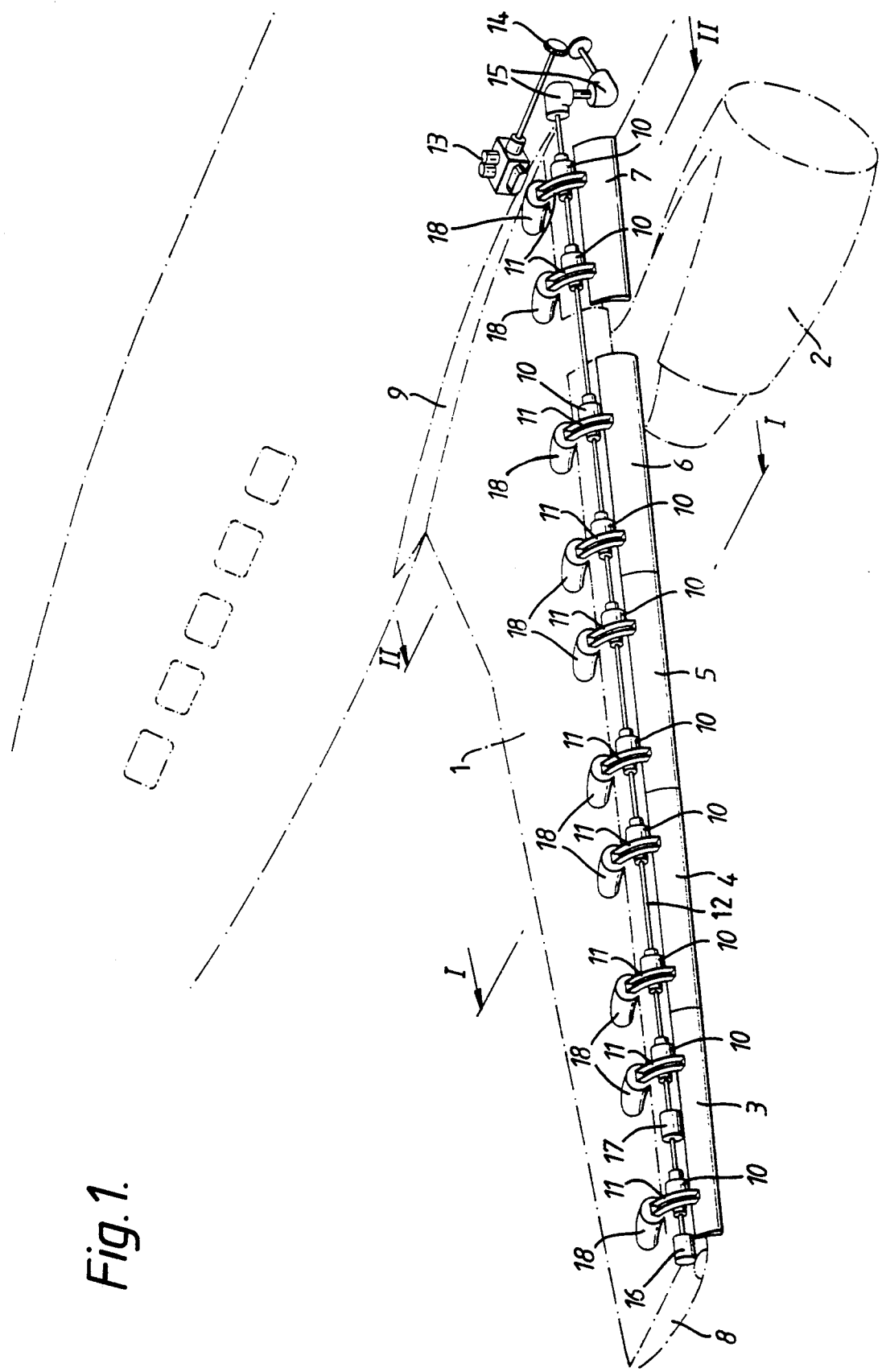
FIG. 1 is a perspective view of a starboard wing of an airliner partly cut away.

In FIG. 1, the starboard wing 1 of a jet airliner having podded underslung engines 2 has leading edge slats 3, 4, 5, 6 and 7 extending along the leading edge of the wing 1 from a wing tip region 8 to a wing root region 9. The slats are powered by pairs of rotary actuators 10 and rack and pinions 11. A shaft 12 links the rotary actuators and is driven by a power control unit 13 located in the fuselage of the aircraft via a T-gearbox 14 and a right-angled gearbox 15. The shaft 12 also drives an asymmetry position pickoff unit 16 and a wing tip brake unit 17. Track-cans 18 are located within the wing to receive the racks of the rack and pinion mechanisms 11 whenever the slats 3–7 are retracted, as will be described in more detail with reference to FIGS. 2A, 2B, and 2C.

Figure 2A:
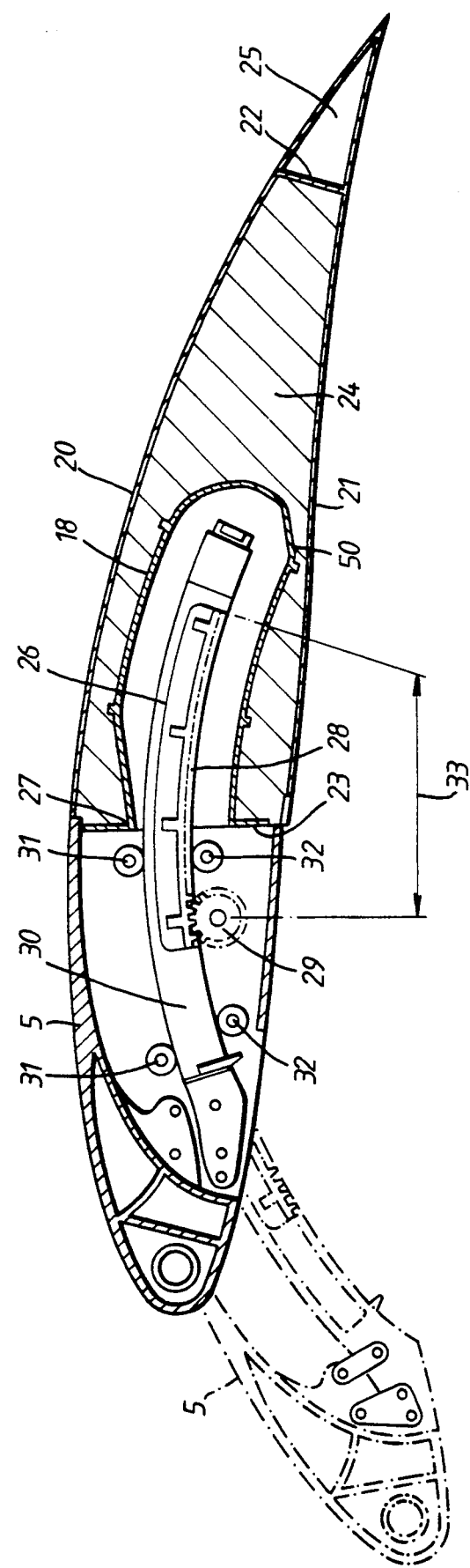
FIG. 2A is a cross-section through a typical wing slat drive system at a first wing location.

In FIG. 2A is shown a cross-section through the wing shown in FIG. 1 along the line I—I and looking towards the wing tip area 8. A main wing box is bounded by upper and lower wing skin surfaces 20 and 21, and by trailing and leading wing walls 22 and 23. Fuel 24, indicated by cross-hatching, is carried within the main wing box section. Attached to the trailing wing wall 22 is an aerodynamically shaped trailing edge section 25. A slat 5 is mounted for arcuate movement between an extended position, shown hatched, and a fully retracted position, indicated by full lines, within a track 26 extending arcuately through an oval or circular aperture 27 in the leading wing wall 23. The slat carries a rack 28 which engages a pinion 29 located ahead of the leading wing wall 23. The rack 28 is carried on an arm 30 which is slideably mounted within the track 26 and between rollers 31 and 32. The length of the track, indicated by the numeral 33, determines the length of slat travel, in this case 24 degrees arcuate. Because the track 26 extends into the main wing box section it must be protected from fuel 24, and this protection is provided by track-can 18, which completely surrounds the track 26 and is bolted to the leading wing wall 23 adjacent the aperture 27.

FIG. 2B is a cross-section of the wing of FIG. 1 along the line II—II again looking in the direction of the wing tip region 8. Elements common to the section shown in FIG. 2A have been given identical reference numbers and will not be described again. The drive system at the section shown in FIG. 2B does not involve a rack and pinion but instead uses a rotary actuator 34 driving an articulated link 35 hinged about a pivot 36. The link 35 is also pivotally attached at 37 to arm 26 which, as before, is slideably mounted between track support rollers 31 and 32. A travel stop 38 determines the extent to which the slat 5 is moved forward of the main wing box in its extended position. The track 26 as before extends into the main wing box section and accordingly has to be protected from fuel 24 by means of track-can 18 which is generally similar to that shown in FIG. 2A. The closed end of the track-cans 18 may differ in shape according to the position of the track they cover within the main wing box section due to the proximity or otherwise of the wing skin surfaces 20 or 21 or attachments thereto. For example, the closed end may have a planar portion 50.

FIG. 2C shows a section through a typical track-can 18 which has a closed cap-end 39 and an open flange-end 40. The cap-end 39 may be provided with a drainage or bleed hole 41 and the flange-end is provided with an oval or circular flange 42 suitably drilled for securing to the leading wing wall 23 in FIG. 2A or FIG. 2B. In some cases a portion of the cap-end 39 at the closed end will be broader than the rest of the part. The conventional method of manufacture of track-cans 18 is to form them in two halves split along the line in a vertical plane as shown in FIG. 2C. The two halves are then seam welded along that line. It is difficult to automate such seam welding or, indeed, to perform it manually; and moreover, the formation of the two halves requires a tool of unconventional shape.

In a non-limiting example of a method according to the invention, track-cans are formed from three separate components, i.e., the cap-end 39, the flange-end 40 (which may terminate as an oval at the end which will be the orifice of the formed can), and an open-ended body portion 43, shown in FIG. 2C. These components have substantially circular interface regions edges which may be welded by robotic welding apparatus to form substantially circular welds 44.

A method of manufacturing the various components of the track-cans 18 will now be described with reference to FIGS. 3A–3D, FIG. 4 and FIG. 5.

FIGS. 3A–3D illustrate steps in the manufacture of a cap-end for a track-can 18. The method is generally similar to that used to manufacture the flange-end 40 and the body section 43, but where there are differences, these will be described.

Figure 3A:
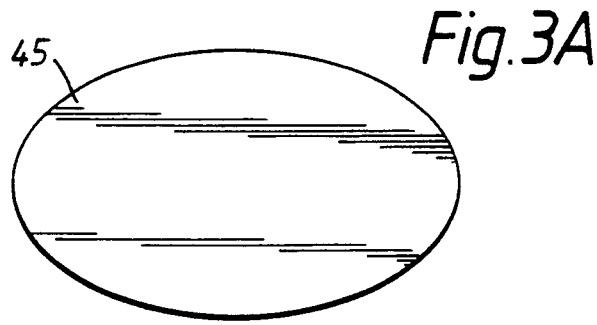
FIGS. 3A–3D illustrate steps in the manufacturing sequence of a cap end component.
Figure 3B:
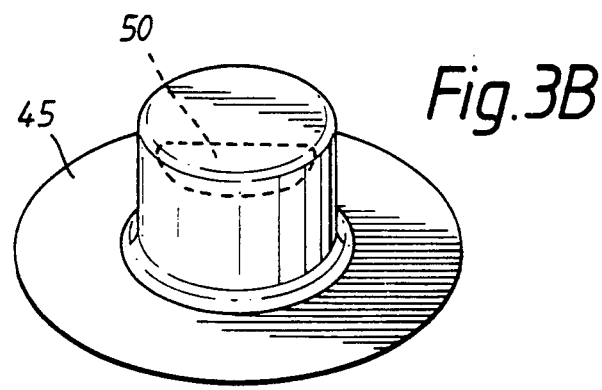

The first step in the manufacture of a cap-end 39 is to cut a circular blank 45 as shown in FIG. 3A from a sheet of aluminium, steel or titanium as desired. The blank 35 may be heat treated if required. Next, the circular blank is placed in a fluid-form machine as shown schematically at 46 in FIG. 4. A top-hat shape is preformed by means of a punch 47 against the resistance of a rubber bag 48 filled with fluid under pressure and contained within an open-ended structure 49 within the fluid-form machine 46. The punch 47 may be provided with a relieved area 51 to provide a profile 50 to the closed end of the cap-end as required, depending on the intended location of the finished track-can within the wing box section.

Figure 3C:
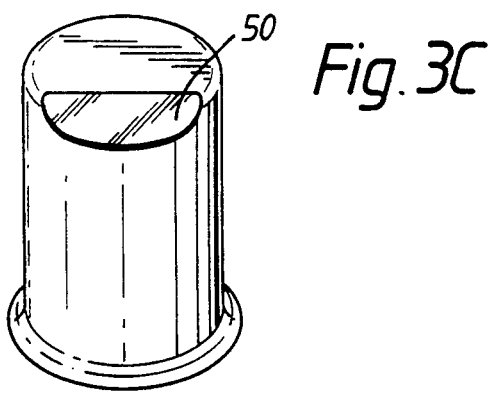

The preformed top-hat shape is then drawn into the elongated shape shown in FIG. 3C retaining the desired end-profile to suit the flap-track/spar configuration concerned.

Figure 3D:
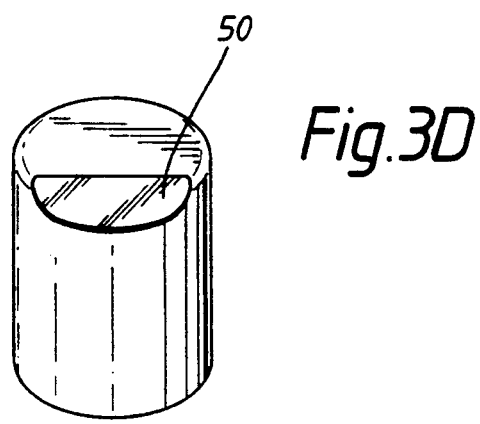
Figure 4:
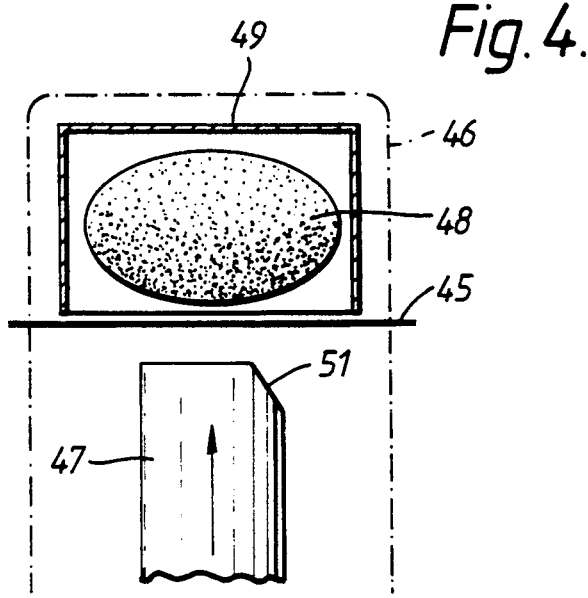
FIG. 4 is a schematic diagram illustrating a fluid forming technique.

Finally, the drawn cap-end is then expanded in a female split cavity die to the desired dimensions. The open end rim may be machined to provide the desired configuration for connection to the body section 43. During the forming process the top-hat shape may be removed and heat treated, as required. The final cap-end is shown in FIG. 3D.

The flange-end of the track-can is formed in a similar manner to that described with reference to the cap-end above. A circular aluminium, steel or titanium blank is cut from a sheet of that material. The blank may be heat treated if desired and is then placed in a fluid-form machine and a cylindrical tool advanced against the blank against the resistance of a bag filled with fluid under pressure to form a top-hat shape. In this case, however, the desired flange profile is obtained by cutting from the top-hat rim, and the closed end of the top-hat shape is machined off. The open-ended top-hat is then expanded into a female tool for final dimensional accuracy and bolt holes are drilled in the flange to correspond with bolt holes in the leading wall of the wing box section.

The body of the track-can is formed in a similar way except that the open end rim and the closed end of the top-hat shape are both machined off to form a generally cylindrical open-ended body. The open-ended body is expanded into a female tool of the desired arcuate profile for final dimensional accuracy.

Figure 5:
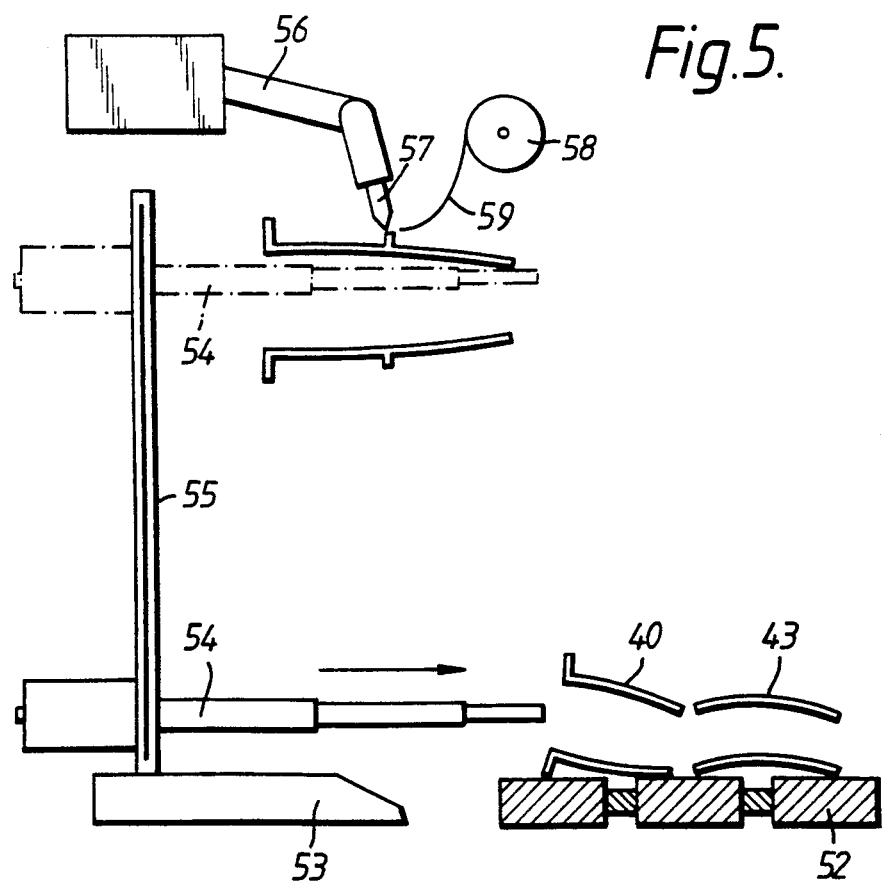
FIG. 5 is a schematic diagram of a track-can robotic welding apparatus.

Having manufactured the necessary three components of the track-can, i.e., the cap-end, the flange-end and the body, the components are placed in pairs on pallets and positioned adjacent to a robotic welding apparatus as shown schematically in FIG. 5. In FIG. 5, a flange-end 40 and a body 43 are shown positioned on a pallet 52 adjacent the base 53 of a robotic welding machine. An expanding mandrel 54 is slideably mounted on a vertical rail 55 above which is located a robotic arm 56 carrying welding terminals 57 and adjacent a supply 58 of welding material 59. It will be understood by those skilled in the art that in the following description of the operation of robotic welding machine shown in FIG. 5, all the functions are carried out automatically by the machine which has suitable power systems (not shown) for expanding, raising and lowering the mandrel 54, moving the robotic arm 56, driving the feed 58, and activating the welding terminals 57. These functions may be performed sequentially under the control of a computer (not shown).

The mandrel 54 is lowered and expanded as shown by the full line in FIG. 5 so as to pick up the two pieces 40 and 43 of the track-can, with their circular interface region edges in contact. The mandrel is then raised to the position shown hatched in FIG. 5 and the welding terminals 57 moved to a position adjacent the circular interface regions of the component parts of the track-can by means of the robotic arm 56. The mandrel 54 is then rotated and the circular interface regions welded together as they pass beneath the terminals 57.

The welding operation described above is repeated using the now welded flange-end and body as one component and the cap-end of the track-can as the other. The finished track-can will have the form shown in FIG. 2C with welds 44 at the two circular interface regions.

Although in the embodiment described, the track-can is manufactured from three parts, it could instead be manufactured from two parts, four parts, or more.

It will be understood by those skilled in the art that many other deep-drawing processes could be used to form the track-cans, other than fluid forming.

It should be appreciated that the parts comprising the track-cans do not necessarily have to be cylindrical, or even substantially cylindrical. In some circumstances it may be advantageous to have the track-cans formed of parts having a square or rectangular cross-section (taken in a direction perpendicular to the longitudinal axis of the track-can).

Many further variations and modifications of the above technique will now suggest themselves to those skilled in the art.

We claim:

1. A method of manufacturing a track-can comprising the steps of:
   cutting at least one first blank from a suitable metal;
   manufacturing a cap-end part having an open end with an interface region and a closed end;
   manufacturing a flange-end part having an open end with an interface region and an open end with a circumferential flange; and
   welding the flange-end part and the cap-end part at their respective interface regions to form the track-can; wherein
   at least one of said cap-end part manufacturing step and said flange-end part manufacturing step includes a step of deep drawing the respective part from said at least one first blank.

2. A method of manufacturing a track-can as claimed in claim 1, wherein said welding step comprises the step of welding said flange-end part interface and said cap-end part interface to one another.

3. A method of manufacturing a track-can as claimed in claim 1, said cap-end part manufacturing step comprising the steps of:
   cutting a blank of predetermined shape from a sheet of suitable metal;
   placing the blank in a deep draw machine;
   pre-forming the blank into a top-hat shape with a punch;
   drawing the top-hat shape into an elongated shape having a predetermined end profile; and
   expanding the drawn shape in a female split cavity die to predetermined dimensions.

4. A method of manufacturing a track-can as claimed in one of claims 1-3, said flange-end part manufacturing step comprising the steps of:
   cutting a blank of predetermined shape from a suitable metal;
   placing the blank in a deep draw machine;
   advancing a tool against the blank and against resistance of a resilient bag under pressure, thereby forming a top-hat shape from the blank;
   cutting a flange profile from a rim of the top-hat shape;
   machining off a blank end of the top-hat shape;
   expanding the open end of the top hat; and
   expanding the open-ended top hat into a female tool for final dimensional accuracy.

5. A method of manufacturing a track-can as claimed in claim 1, said method further comprising the steps of:
   cutting a second blank from a suitable metal;
   manufacturing a central body portion having an interface region corresponding to said cap-end interface region and an interface region corresponding to said flange-end part interface region, said central body portion including a step of deep drawing said central body portion from said second blank; and
   welding said cap-end part and flange-end part interfaces to their corresponding central body portion interfaces.

6. A method of manufacturing a track-can as claimed in claim 5, said central body portion manufacturing step comprising the steps of:
   cutting a blank from a suitable metal;
   placing the blank in a deep-draw machine;
   advancing a tool against the blank and against resilience of a bag under pressure, thereby forming a top-hat shape from the blank;
   machining off an end of the top-hat shape and a rim of the top-hat; and
   expanding the machined shape into a female tool for final dimensional accuracy.

7. A method of manufacturing a track-can comprising the steps of:
- separately manufacturing a plurality of substantially tubular parts each having at least one interface region having a shape corresponding to a shape of an interface region of another of said plurality of tubular parts to which it is to be connected, said manufacturing step including the steps of cutting at least one blank from suitable metal and deep drawing at least one of said substantially tubular parts from said at least one blank; and
- connecting the plurality of tubular parts together at their respective interface regions to form the track-can.

8. A method of manufacturing a track-can comprising the steps of:
- cutting at least one first blank from a suitable metal;
- placing the blank in a deep draw machine;
- pre-forming the blank into a top-hat shape with a punch;
- drawing the top-hat shape into an elongated shape having a predetermined end profile;
- expanding the drawn shape in a female split cavity die to predetermined dimensions, thereby forming a cap-end part having an open end with an interface region and a closed end;
- manufacturing a flange-end part having an open end with an interface region and an open end with a circumferential flange; and
- welding the flange-end part and the cap-end part at their respective interface regions to form the track-can.

9. A method of manufacturing a track-can comprising the steps of:
- cutting at least one first blank from a suitable metal;
- manufacturing a cap-end part having an open end with an interface region and a closed end;
- placing the blank in a deep draw machine;
- advancing a tool against the blank and against resistance of a resilient bag under pressure, thereby forming a top-hat shape from the blank;
- cutting a flange profile from a rim of the top-hat shape;
- machining off a blank end of the top-hat shape;
- expanding the open end of the top hat;
- expanding the open-ended top hat into a female tool for final dimensional accuracy, thereby forming a flange-end part having an open end with an interface region and an open end with a circumferential flange; and
- welding the flange-end part and the cap-end part at their respective interface regions to form the track-can.

10. A method of manufacturing a track-can comprising the steps of:
- cutting at least one first blank from a suitable metal;
- manufacturing a cap-end part having an open end with an interface region and a closed end;
- cutting a second blank from a suitable metal;
- placing the blank in a deep-draw machine;
- advancing a tool against the blank and against resilience of a bag under pressure, thereby forming a top-hat shape from the blank;
- machining off an end of the top-hat shape and a rim of the top-hat; and
- expanding the machined shape into a female tool for final dimensional accuracy, thereby forming a central body portion having an interface region corresponding to said cap-end interface region and an interface region corresponding to said flange-end part interface region, said central body portion including a step of deep drawing said central body portion from said second blank;
- welding said cap-end part and flange-end part interfaces to their corresponding central body portion interfaces;
- manufacturing a flange-end part having an open end with an interface region and an open end with a circumferential flange; and
- welding the flange-end part and the cap-end part at their respective interface regions to form the track-can; wherein
- at least one of said cap-end part manufacturing step and said flange-end part manufacturing step includes a step of deep drawing the respective part from said at least one first blank.

* * * * *